(No Model.)
C. H. CHAMBERLIN.
METHOD OF AND MEANS FOR INCREASING THE POWER OF STREAMS OF WATER FROM HOSE, &c.
No. 372,299. Patented Nov. 1, 1887.
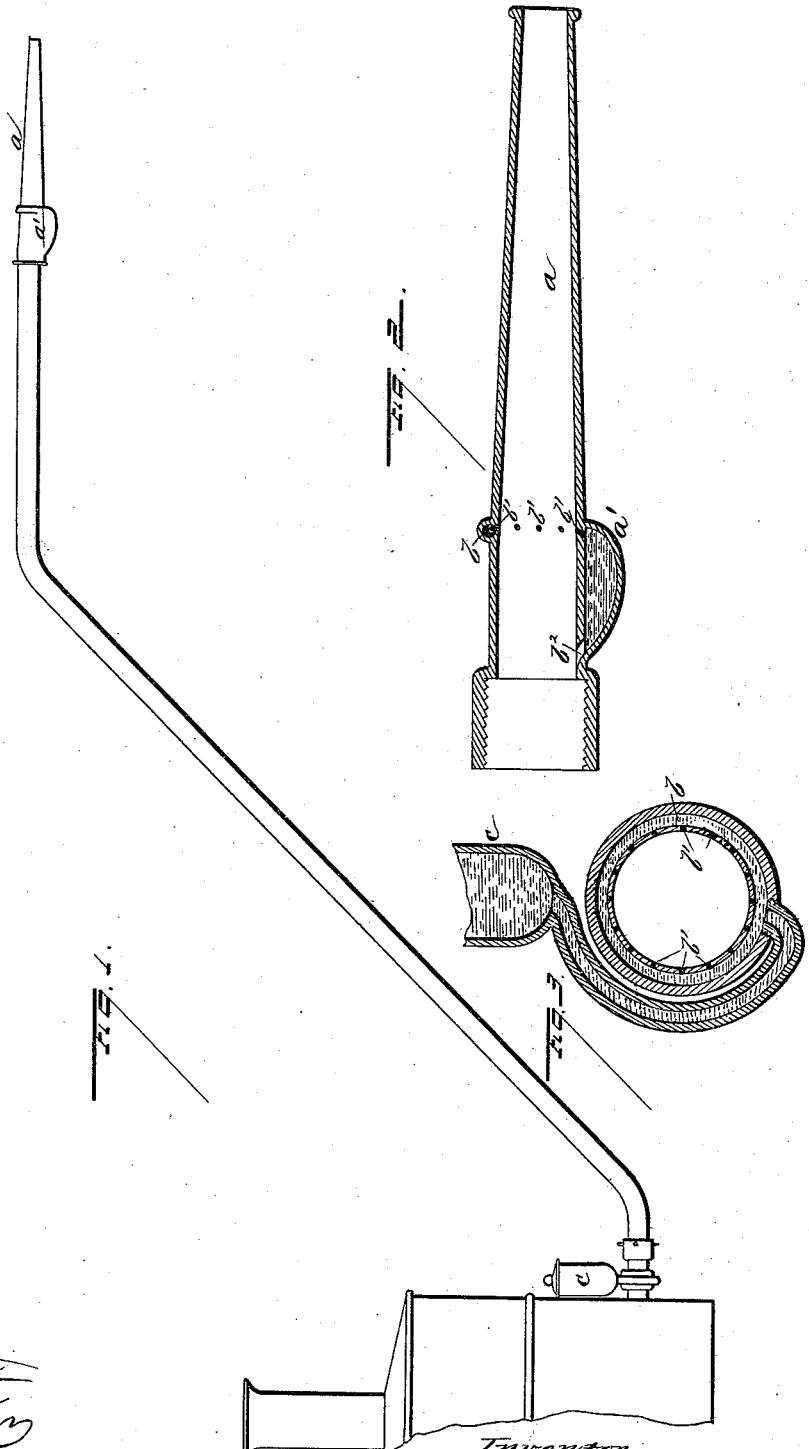

UNITED STATES PATENT OFFICE.

CHARLES H. CHAMBERLIN, OF CHICAGO, ILLINOIS.

METHOD OF AND MEANS FOR INCREASING THE POWER OF STREAMS OF WATER FROM HOSE, &c.

SPECIFICATION forming part of Letters Patent No. 372,299, dated November 1, 1887.

Application filed January 7, 1887. Serial No. 223,684. (No model.)

*To all whom it may concern:*

Be it known that I, CHARLES H. CHAMBERLIN, a citizen of the United States, residing at Chicago, in the county of Cook and State of Illinois, have invented certain new and useful Improvements in Methods of and Means for Increasing the Power of Streams of Water from Hose, &c., of which the following is a specification, to wit:

This invention relates to methods of and means for increasing the power of streams of water from hose, &c.; and it consists in applying to the stream a thin coating of oil, to protect it from the action of the air and retain it in bulk, substantially as will be hereinafter more fully set forth and claimed.

In order to enable others skilled in the art to which my invention pertains to make and use the same, I will now proceed to describe its application and use, referring to the accompanying drawings, in which—

Figure 1 is a part of a fire-engine with a hose having my device shown in use. Fig. 2 is a longitudinal section of a hose-nozzle, showing means for using my invention therewith; and Fig. 3 is a transverse section of the hose-connection at the engine, showing another way of applying the oil.

In the use of pumps with hose attachment of all kinds much power is wasted by the friction of the water in the hose and pipe, the unsteadiness of the boiling, whirling stream in the hose and pipe, and the contact of the water with the air after leaving the nozzle. When the stream leaves the nozzle of the hose, it is in a solid body, and is thrown forward in a direct line till it sprays out and falls to the ground. The friction of the air and action of the wind force the air in between the particles of water, they become separated, and can be thrown but little farther after this separation occurs, while the force applied would project the water to a much greater distance if it could be retained in a solid and compact body. This is of especial importance in fire-hose and similar articles, where it is absolutely necessary that the operator should stand at a considerable distance at one side of or below the fire, and it is to enable the mass of water to be retained in a solid body for a longer time that is the object I have in view.

To this end I contemplate applying to the stream of water, in any proper manner, a quantity of oil, which will spread over the surface of the stream in a thin layer and protect it, first, from friction against the inside of hose and pipe, and, second, from the action of or contact with the air till it can be projected in a solid body to the desired point. This may of course be done in a variety of ways; but in the drawings herewith I have shown two of these ways.

In Figs. 1 and 2 I have shown a hose-nozzle, $a$, provided with an oil-chamber on one side, as at $a'$, which chamber has at its forward end a cored passage, $b$, completely encircling the nozzle and provided with a series of fine perforations, $b'$, which communicate with the interior of the nozzle, as shown. An opening, $b^2$, is also made at the rear end of the oil-chamber, and from this it will be evident that the force of the flowing water will be applied through the rear opening, $b^2$, and this pressure forces the oil through the series of perforations $b'$, and it spreads itself in a thin film over the surface of the stream, fully protecting it from the separating action of the air.

In Figs. 1 and 3 I have also shown an oil cup or reservoir, $c$, communicating with the hose-connections by a cored passage, $b$, and perforations $b'$, as before. This device is applied to the hose at any desired point, but is herein shown applied at the engine connection or coupling, and is the preferred mode or point of application, as the coating of oil is made to cover the water through its entire passage through the hose and effectually lubricates its passage, saves wear upon the hose, and prevents the whirling or boiling of the water in the hose, allowing the latter to lie steady and quiet.

It will be understood at once that various other means of applying the oil can be used without departing from the spirit of my invention, and that the kind of oil will make no difference. The quantity of oil used is exceedingly small, and in no way injures the capacity of the water as a fire-extinguisher, as it spreads itself in so thin a film as to require but a very small quantity to well serve the purpose. This is readily applied to any of the fire-extinguishing apparatus in common use, and at once adds largely to the effectiveness of any stream, especially where it is to be thrown to great distances, and will enable a pump of any given capacity to throw a stream farther than would otherwise be possible.

I do not desire to confine myself to the means herein shown or described for applying the oil, as this may be greatly varied, and the oil will at once assume its position upon the surface of the stream, whether applied as herein shown or injected in a single jet to the surface, or even to the center of the stream, and the same effect will be produced of solidifying the water into a practically solid body that can readily be handled and projected to better advantage than is ordinarily the case; nor do I desire to confine the uses of my invention to fire-extinguishing apparatus, as the benefits of my invention are equally apparent in hydraulic mining and all other similar uses of streams of water by force.

Having thus fully described my invention, what I claim as new, and desire to secure by Letters Patent, is—

1. The herein-described method of increasing the force of water-streams, as from a hose, by applying to the stream or body of water a thin covering of oil to protect it from the air, substantially as and for the purpose set forth.

2. The combination, with a hose or other water-tube, of an oil-reservoir connected with said tube, whereby the oil is drawn into the tube around the body of water, substantially as set forth.

3. The combination, with a hose or other water-conductor, of an oil-reservoir connected with said conductor by a series of perforations extending entirely around the same, substantially as and for the purpose set forth.

4. The combination, with a hose or other water-conductor, of an oil-reservoir having a connection with the conductor at each end, whereby the force of the moving water is applied behind the oil to force it out, substantially as and for the purpose set forth.

In testimony whereof I affix my signature in presence of two witnesses.

CHARLES H. CHAMBERLIN.

Witnesses:
W. C. McArthur,
W. S. McArthur.